Patented Dec. 3, 1940

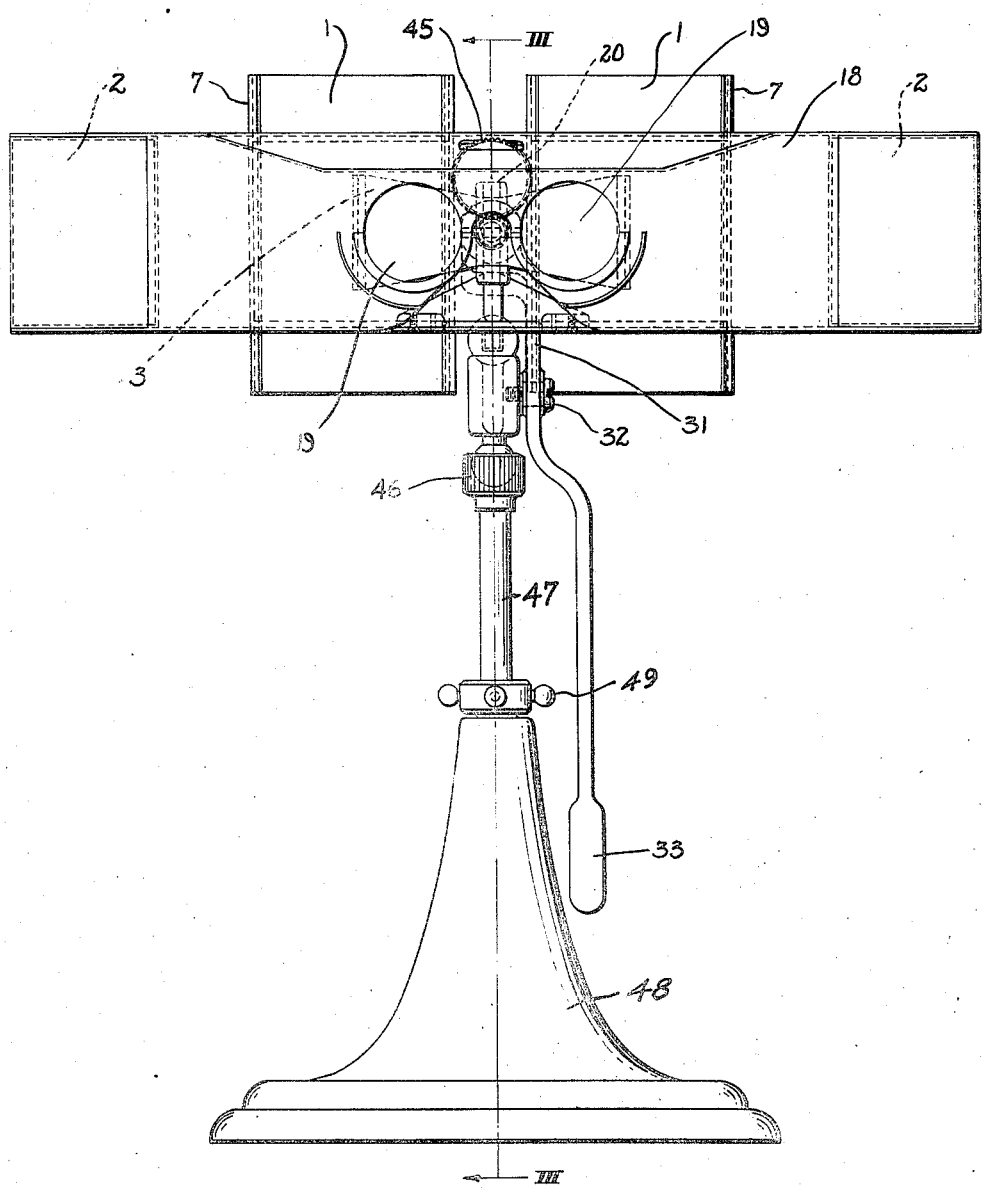
FIG. I

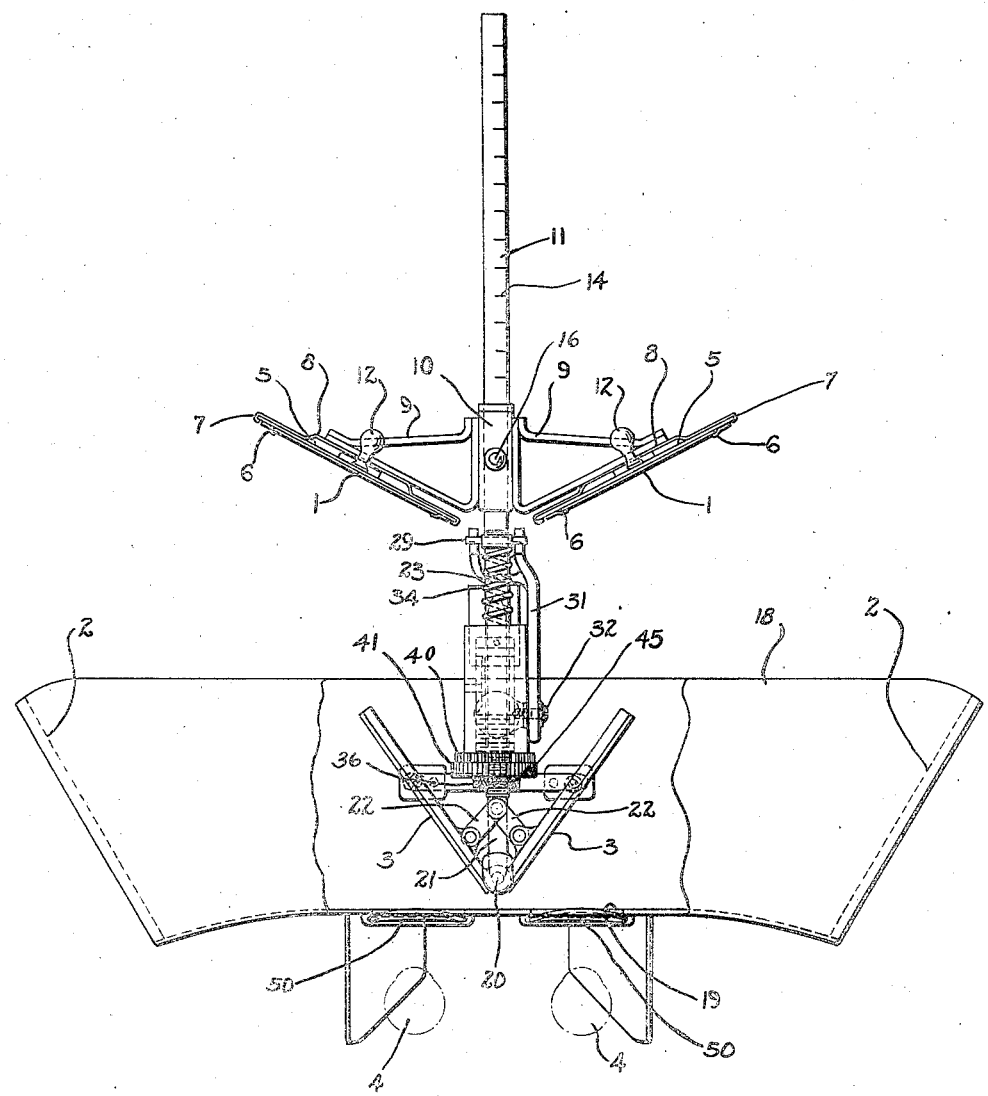
FIG. II

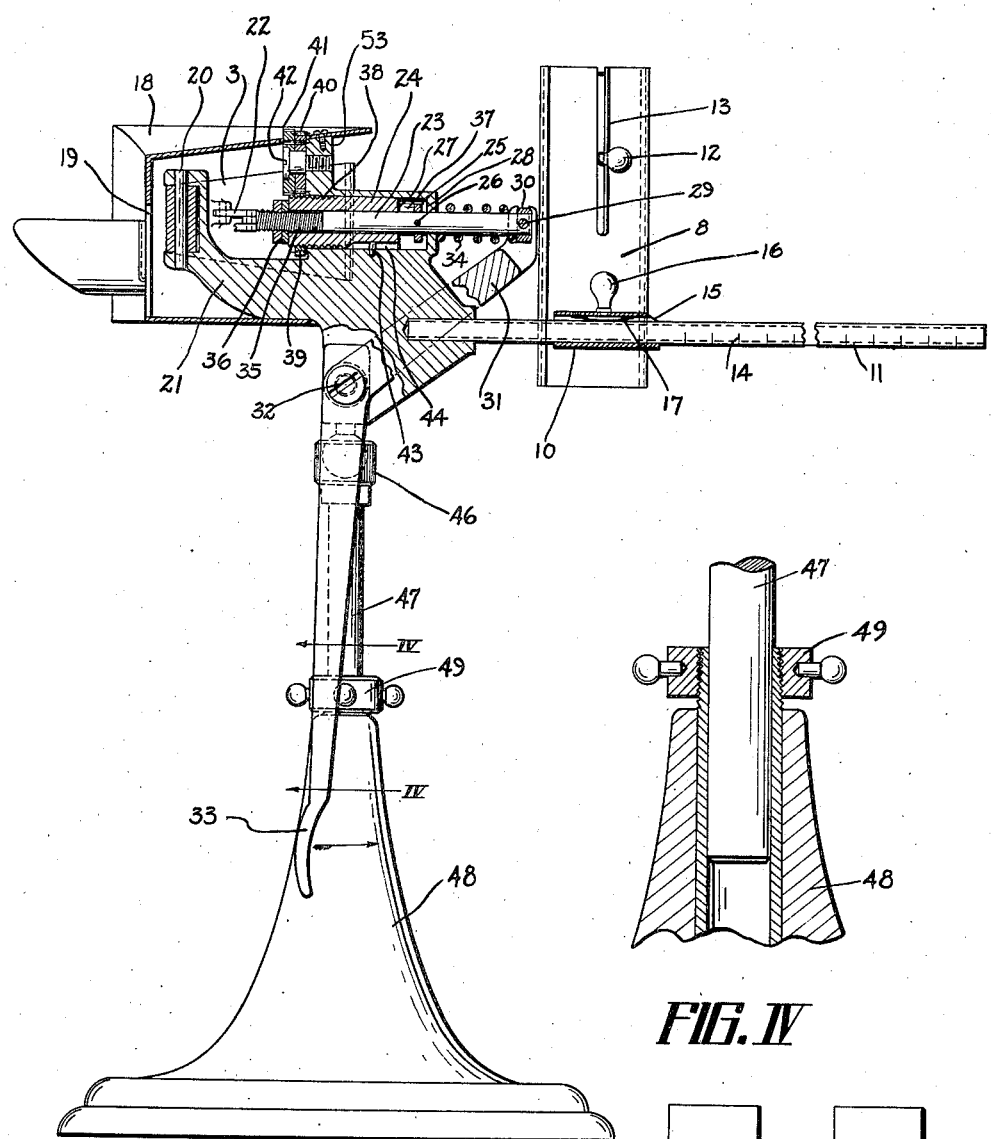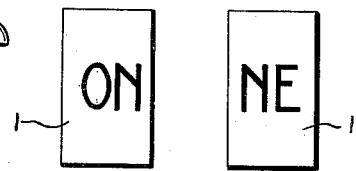

2,223,361

UNITED STATES PATENT OFFICE 2,223,361

OPHTHALMIC INSTRUMENT

George C. Favre, Southbridge, Mass., assignor to American Optical Company, Southbridge, Mass., a voluntary association of Massachusetts Application October 2, 1936, Serial No. 103,691

5 Claims. (Cl. 128—76.5)

This invention relates to improvements in ophthalmic instruments and has particular reference to improved means and method of exercising and stimulating the eyes.

One of the principal objects of the invention is to provide improved means and method of exercising the muscular structure of the eyes under varying degrees of accommodation.

Another object is to provide an instrument of the character described having means for obtaining single binocular vision of spaced fixation objects whereby images of said fixation objects may be moved to produce an effect on the eyes similar to that produced by various combinations of prismatic lens powers but in a more convenient and effective manner whereby the intrinsic and extrinsic muscles of the eyes may be exercised and the eyes stimulated.

Another object is to provide an instrument embodying reflective means for directing the images of the fixation objects to the eyes at different angles for single binocular vision to introduce an effect similar to that obtainable with glass prisms whereby the chromatic aberrations usually present in such prisms will be eliminated.

Another object is to provide means, whereby the distance of the fixation objects from the eyes may be varied to change the accommodative effort of the eyes, so constructed that the said fixation objects may be reciprocated in a direction toward and away from the eyes to exercise the accommodative faculties of the eyes, and to provide scale and indicator means associated with said adjustable fixation objects for indicating the adjusted positions of said fixation objects from the eyes so that the amount of accommodation being used during the exercising of the intrinsic and extrinsic muscles of the eyes may be definitely known.

Another object is to provide means whereby compensating lenses may be utilized for suppressing or stimulating any part of accommodation when the fixation objects are adjusted to given positions whereby the movement of said targets from said given position toward or away from the patient will impart an exercising of accommodation or develop amplitude.

Another object is to provide a device whereby fixation cards of the usual regular standard type now in commercial use may be used in an instrument of this character.

Another object is to provide a device for exercising the eyes whereby errors due to muscular imbalance either in the vertical or horizontal planes may be compensated for so as to enable obtaining of single binocular vision of spaced fixation objects and to provide means whereby the muscular structure of the eyes may be exercised under varying degrees of accommodation while the eyes tend to maintain single binocular vision.

Another object is to provide simple, efficient and economical means for rectifying various ocular defects by exercising the eyes.

Other objects and advantages will become apparent from the following description taken in connection with the accompanying drawings and it will be apparent that many changes may be made in the details of construction, arrangement of parts, and methods shown and described without departing from the spirit of the invention as expressed in the accompanying claims. I, therefore, do not wish to be limited to the exact details of construct, arrangement of parts, and methods shown and described as the preferred form only has been set forth by way of illustration.

Referring to the drawings:

Fig. I is a front elevation of the device embodying the invention;

Fig. II is a plan view of the device shown in Fig. I showing a portion of the housing removed to expose the internal mechanism;

Fig. III is a sectional view taken on line III—III of Fig. I and looking in the direction indicated by the arrows;

Fig. IV is an enlarged sectional view taken on line IV—IV of Fig. III; and

Fig. V is a face view of one type of fixation object.

There have been in the past several devices designed for exercising the eyes. Most of these devices have employed the use of a single moving target which was placed within the direct field of vision of the eyes. With such devices both eyes were adapted to be fixed on the single target either through their own accommodations or through the use of prisms. The target was then moved back and forth in different meridians or rotated in various different paths to exercise the eyes.

In other instances, instruments of this character were designed to operate automatically. Such instruments involved the use of complicated mechanism driven by a motor and were very expensive and difficult to manufacture.

In instances wherein the devices employed both the use of a single fixation object and separate stereograms and targets with means such as prisms for obtaining single binocular fixation and exercises, the prisms introduced chromatic aberrations which were very annoying to the patient and are considered detrimental to progress in eye exercise. Such devices also require the constant attention of the practitioner.

In instances where the devices were of the automatically operating nature embodying the use of motor driven mechanism the instruments were too complicated and expensive for wide distribution. Such instruments, however, did prove beneficial to the eyes and it, therefore, is one of the primary objects of this invention to provide an eye exercising instrument which will embody all of the desirable features of prior art instruments and which together with other advantageous features will obviate substantially all of the prior art difficulties encountered in the manufacture and use of such instruments.

The device embodying the invention comprises three main features:

1. Means for reflecting the images of a plurality of fixation objects so that each eye sees only one of said objects and so that the angle of vision may be so adjusted that the said objects may be fused to produce single binocular vision in combination with means for moving the reflective means for introducing effective prism displacement of the images of the fixation objects to exercise the eyes and stimulate the retina in the margin as well as the macula area during the movement of said objects.

2. Means for supporting the fixation objects so that they may be adjusted vertically relative to each other to compensate for vertical phorias and so that they may be reciprocated toward and away from the patient's eyes to exercise the accommodative faculties of the eyes or be moved to fixed positions at varying distances from the eyes to introduce controlled accommodative effort during the exercising of the eyes.

3. Means for supporting compensating lenses before the eyes to suppress or stimulate any part of accommodation when the fixation objects are adjusted to controlled positions and to function cooperatively with the movements of the targets from said positions toward or away from the patient to exercise the accommodation of the eyes.

Referring more particularly to the drawings wherein like characters of reference designate like parts throughout the several views, the device embodying the invention comprises a pair of charts 1 having fixation objects thereon adapted to be reflected by angled mirrors 2 and 3 into the eyes 4 of the patient so that each eye sees only one of said objects. The fixation objects 1 are adapted to be held in suitable supports 5 by spring clamp means 6 along the opposed side edges thereof. The support 5 is slidably mounted in the slideways 7 of a main supporting plate 8 carried by a bracket 9. The bracket 9 is mounted on a slide member 10 slidably mounted on a slide rod 11 carried by the front of the instrument.

The support 5 is provided with a handle 12 fitting within a slot 13 formed in the supporting plate 8 and is adapted to provide means whereby the chart 1 and the holder 5 may be adjusted vertically to compensate for vertical phorias or imbalance of the eyes. The main slide 10 provides means whereby the chart 1 having the fixation objects thereon may be adjusted to varying positions longitudinally of the slide rod 11. Suitable scale means 14 and indicator means 15 are provided for indicating the position thereof relative to the eyes. The slide 10 is provided with a suitable handle 16 which may be grasped for movement thereof to said adjusted positions. A suitable friction spring 17 is provided internally of the slide 10 for frictional engagement with the slide rod 11 to hold the fixation charts in adjusted position thereon.

It is also to be noted that in addition to adjusting the fixation objects to given distances from the eyes the said fixation objects may be reciprocally moved back and forth longitudinally of the slide rod 11 to introduce an exercise of the accommodative faculties of the eyes and to develop amplitude.

Although there is shown in Fig. V one set of fixation objects it is to be understood that fixation objects having varying characteristics may be employed and that the fixation objects which are adapted to be used with the device embodying the invention may be any of those known and used commercially.

The reflectors 2 are supported by a housing 18 at a fixed angular position relative to the plane of the fixation objects. These reflectors are adapted to reflect or deflect an image of each fixation object so that the said images will be visible to their respective eyes in the reflectors 3. The housing 18 is provided with suitable sight openings 19 through which the eyes 4 are adapted to view the images in the reflectors 3.

The reflectors 3 are pivoted at 20 adjacent their forward ends to a support 21 so that they may be swung about said pivot towards and away from each other to increase or decrease the angle therebetween. The reflectors 3 are connected by pivoted link members 22 to a slide rod 23 which is adapted to be reciprocated back and forth in the longitudinal bore of a slide sleeve 24, the reciprocatory movement of said rod 23 being limited by a stop washer or disc 25 attached to said slide by a pin member 26. The stop washer or disc 25 is adapted to engage at one extreme position the end 27 of the sleeve 24 and at its other extreme position the side wall 28 of the end of the bore in which the sleeve 24 is fitted.

The slide rod 23 is pivotally attached at 29 adjacent its rearmost end to a pivot block 30 carried by the end of a rock lever 31. The rock lever 31 is pivoted at 32 to the support 21 and is provided with a long operating lever extension 33 by which it may be moved back and forth about the pivot 32. This lever 31 is adapted to move the slide rod 23 internally of the sleeve 24. Suitable resilient means 34 is mounted on the slide rod 23 and is adapted to act against the action of the lever 31 so that when pressure is applied to the lower portion 33 to rock the lever 31 about its pivot 32 this action will cause the spring 34 to compress and when the pressure is released at 33 the said spring will tend to cause the lever to return to its initial position.

The forward end of the slide rod 23 is threaded as indicated at 35 and is provided with a pair of check nuts 36 which may be adjusted and locked in adjusted position to vary the amount of rearward sliding movement of the rod 23. By adjusting the nuts 36 more towards the forward end of the rod the said resilient means 34 will cause the said rods to move rearwardly the amount of said adjustment and vice versa.

The above arrangement provides means whereby the mirrors 3 may be oscillated about the pivot 20 through movement of the lever 33. This oscillatory movement is to impart an exercise to the intrinsic and extrinsic muscles of the eyes but prior to said oscillatory movement it is essential that the eyes obtain single binocular vision of the fixation objects. This is brought about by adjustably supporting the sleeve 24 internally of the bore 37 in the support 21. The sleeve 24 is provided adjacent its forward end with an external threaded portion 38 on which is threadedly mounted a gear 39. The gear 39 is in constant mesh with a gear 40 carried by a thumb wheel 41 pivotally connected at 42 to an upright 53 on the main support 21. When the thumb wheel 41 is rotated with the gear 40, it is adapted to rotate the gear 39 causing the said gear to be threaded on to the threaded portion of the sleeve 24.

This causes the sleeve to move forwardly or rearwardly of the bore 37, depending of course upon the direction in which the gear 39 is rotated. In this instance the spring 34 again functions to cause the sleeve 24 to be drawn internally of the bore 37 when the gear 39 is threaded outwardly towards the forward end of the threaded portion 38 on said sleeve. A suitable key and key-way 43 and 44 is provided to prevent rotation of the sleeve 24 during said adjustment.

This movement of the sleeve 24 back and forth in the bore 37 causes the slide rod 23 to move simultaneously thereto by similar amounts and in turn cause the link members 22 to rock the reflectors 3 about their pivot 20 to change the angle therebetween. The amount of movement or angle to which the mirrors are moved may be indicated by suitable scale means carried by the face 45 of the thumb wheel 41, suitable indicator means being associated with said scale.

It is apparent therefore that by adjusting the thumb wheel 41 the angle of reflection of the mirrors 3 may be altered to compensate for varying degrees of divergence or convergence of the eyes whereby single binocular vision of the fixation objects may be obtained. To bring about this result, it may also be necessary to adjust one or the other of the objects vertically to compensate for vertical deviation. The main feature which is to be accomplished by turning the thumb wheel 41 is that of obtaining single binocular vision of the fixation objects by the changing of the angle of the mirrors 3 to fixed adjusted positions. The mirrors 3 may thereafter be oscillated from said fixed position to increase or decrease the angle therebetween by movement of the lever 33 against and with the action of the resilient means 34.

In the case of a divergent squint it will be apparent that in order to obtain single binocular vision of the fixation means it may be necessary to first rotate the thumb wheel 41 to cause the angle between the mirrors 3 to be increased an amount sufficient to compensate for the amount of divergence of the eyes so that single binocular vision may be obtained. The exercise to the intrinsic or extrinsic muscles is then imparted to the eyes while maintaining single binocular vision of the fixation means by oscillating the mirrors 3 backward and forward about the pivot 20. The same procedure is followed for convergent squint cases only in this particular instance the adjustment of the mirrors 3 to obtain single binocular vision will be opposite that for the divergent squint.

It will be noted that in the divergent squint case if it is desired to direct the exercising more particularly to the internal recti muscles of the eyes the lever 33 is first moved in a rearward direction to cause the angle between the mirrors 3 to be increased to its greatest possible extent. While holding said handle 33 in said rearward position the thumb wheel 41 is adjusted to alter the angle between the mirrors 3 by an amount sufficient to bring about single binocular vision of the fixation means. After this adjustment has been completed the mirrors are oscillated about their pivot 20 by releasing and reestablishing pressure on the lever 33. This causes the mirrors to move from their outermost normal position at which single binocular vision of the fixation means has been attained, towards each other to decrease the angle therebetween whereby a stress will be introduced on the internal recti muscles of the eyes. By oscillating the mirrors at this position an intermittent relaxation and stress on said internal recti muscles is imparted causing the said muscles to be exercised and innervated.

To exercise the external recti muscles the adjustment of the mirrors to obtain single binocular vision of the fixation means is brought about when the lever 33 is in its initial set under the tension of the spring 34. The exercise in this particular instance will be imparted through the increasing of the angle between the mirrors 3 from their initial adjusted position wherein normal binocular vision of the fixation objects is obtained. In other words, this is merely a reversal of the position for the divergent squint case or for exercising the opposite set of muscles.

A general exercising of the extrinsic muscles of the eyes may be obtained by oscillating the mirrors 3 rearwardly and forwardly to increase and decrease the angle therebetween from their initial positions at which normal single binocular vision is obtained. In this particular instance both the internal and external recti muscles are exercised.

It will be noted that in the initial setting of the instrument for the various exercising treatments of the eyes the fixation objects 1 are first adjusted on the slide rod 11 to their greatest possible distance from the eyes and suitable compensating lenses 50 of sufficient strength to fully relax accommodation while viewing said fixation objects at said distance, thereby assisting in making the eyes static, are positioned in suitable lens holders.

To introduce accommodative effort during the exercising of the internal or external recti muscles the fixation objects may be adjusted from said outermost position toward the eyes of the patient to varying positions along the slide rod 11 as determined by the scale and indicator means 14 and 15. This merely introduces given predetermined amounts of accommodative effort during the exercising of the eyes.

By imparting a reciprocatory movement to the fixation objects along the slide rod 11 to cause them to move toward and away from the eyes of the patient an exercising of the intrinsic muscles of the eyes may be attained. The amount of accommodative stress introduced during said exercising depends upon the length of the reciprocatory movement of the targets. The more the targets are moved towards the eyes the greater accommodative effort and stress will be imparted to the intrinsic muscles. This introduces an associate effect upon the extrinsic muscles of the eyes. This is due to the necessity for changing the angle of convergence to conform to the change in the distance of the fixation object while maintaining single binocular fixation.

It is to be understood that charts introducing stereoscopic effects as well as monocular and other forms of exercising may be employed.

The main support 21 is preferably universally connected at 46 to an upright 47 so that the head of the instrument may be tilted to various different angles. The upright 47 is telescopically supported on a base 48 and is adapted to be adjusted upwardly to various different positions and held by a clamp nut 49.

From the foregoing description it will be seen that simple, efficient and economical means have been provided whereby the external and internal muscular structure of the eyes may be strengthened and innervated.

Having described my invention, I claim:

1. In a device of the character described, a support having eye positioning means thereon, fixation means on said support to be viewed by eyes located at said eye positioning means, a pair of light deflecting members pivoted to said support adjacent the eye positioning means and angled relative to each other to converge towards said eye positioning means, a plunger slidably mounted on said support to move towards and away from said eye positioning means and having a pivotal connection with said pair of light deflecting members, means for adjusting said plunger to an initial set position and a lever member pivoted to said support and connected with said plunger for reciprocating said plunger a given amount from said initial set position and for simultaneously varying the angle between said light deflecting members by amounts controlled by the extent of movement of said lever.

2. In a device of the character described, a support having eye positioning means thereon, fixation means on said support to be viewed by eyes located at said eye positioning means, a pair of light deflecting members pivoted to said support adjacent the eye positioning means and angled relative to each other to converge towards said eye positioning means, a plunger slidably mounted on said support to move towards and away from said eye positioning means and having a pivotal connection with said pair of light deflecting members, means for adjusting said plunger to an initial set position, a lever member pivoted to said support and connected with said plunger for reciprocating said plunger a given amount from said initial set position and for simultaneously varying the angle between said light deflecting members by amounts controlled by the extent of movement of said lever and means for biasing said light deflecting members in a direction opposite the movement imparted by the lever for effectively returning the deflecting members to their initial angular relation.

3. In a device of the character described, a support having eye positioning means thereon, a pair of light deflecting members pivoted to said support adjacent the eye positioning means and angled relative to each other to converge towards said eye positioning means, fixation means on said support adapted to be viewed through the use of said light deflecting members by eyes located at said eye positioning means, a plunger slidably mounted on said support to move towards and away from said eye positioning means, said plunger being slidably mounted in a sleeve having an outer threaded surface, stop means on said plunger for engaging one end of said sleeve, means for resiliently urging said plunger in a direction to move said stop means in engagement with the end of said sleeve, a nut-like member threaded on said sleeve, means for rotating said nut-like member to threadedly move said sleeve to different adjusted positions on said support and to simultaneously vary the initial set position of said plunger, said plunger having a pivotal connection with said pair of light deflecting members for moving said members to different angular positions relative to each other about their pivotal connection to the support, and a lever member pivoted to said support and connected with said plunger for reciprocating said plunger a given amount from a given set position and for simultaneously varying the angle between said light deflecting members by amounts controlled by the extent of movement of said lever.

4. In a device of the character described, a support having eye positioning means thereon, fixation means on said support to be viewed by eyes located at said eye positioning means, a mirror attached to said support on each side of said eye positioning means adapted to receive and deflect light rays coming from said fixation means, a pair of light deflecting members pivoted to said support adjacent said eye positioning means and angled relative to each other to converge towards said eye positioning means and being adapted to receive the light rays deflected by the mirrors and direct them towards said eye positioning means, a plunger slidably mounted on said support to move towards and away from said eye positioning means and having a pivotal connection with said pair of light deflecting members, means for adjusting said plunger to an initial set position and for simultaneously positioning the light deflecting members in a given desired angular relation and a lever member pivoted to said support and connected with said plunger for reciprocating said plunger a given amount from said initial set position and for simultaneously varying the angle between said light deflecting members by amounts controlled by the extent of movement of said lever.

5. In a device of the character described, a support having eye positioning means thereon, fixation means on said support having portions to be viewed by the respective eyes of a pair located at said eye positioning means, a pair of light deflecting members, one positioned to each side of said eye positioning means and adapted to receive an image of each respective portion of said fixation means, a second pair of light deflecting members pivoted to said support adjacent the eye positioning means and angled relative to each other to converge towards said eye positioning means, being adapted to receive the images of said respective portions of said eye fixation means and to render them visible to the eyes at said eye positioning means, a plunger slidably mounted on said support to move towards and away from said eye positioning means and having a pivotal connection with said pair of light deflecting members whereby adjustment of said plunger causes a variation of the angle between said second pair of light deflecting members, means for adjusting said plunger to an initial set position and means connected with said plunger for reciprocating said plunger a given amount and in turn varying the angle between said second pair of light deflecting members given controlled amounts from the angle between said second pair of light deflecting members when the said plunger is in said initial set position.

GEORGE C. FAVRE.